United States Patent
de Vos et al.

(10) Patent No.: US 11,544,758 B2
(45) Date of Patent: Jan. 3, 2023

(54) DISTRIBUTED DATABASE STRUCTURES FOR ANONYMOUS INFORMATION EXCHANGE

(71) Applicant: CIRCULARISE B.V., Delft (NL)

(72) Inventors: Jordi de Vos, Rijswijk (NL); Mesbah Sabur, Doetinchem (NL); Pietro Pasotti, Delft (NL); Kaj Oudshoorn, Zwartewaal (NL); Jelle Dirk Licht, The Hague (NL)

(73) Assignee: CIRCULARISE B.V., Delft (NL)

( * ) Notice: Subject to any disclaimer, the term of this patent is extended or adjusted under 35 U.S.C. 154(b) by 0 days.

(21) Appl. No.: 17/114,572

(22) Filed: Dec. 8, 2020

(65) Prior Publication Data
US 2021/0256587 A1    Aug. 19, 2021

Related U.S. Application Data (63) Continuation of application No. PCT/EP2019/065820, filed on Jun. 17, 2019.

(60) Provisional application No. 62/685,781, filed on Jun. 15, 2018.

(51) Int. Cl.
*G06Q 30/00* (2012.01)
*G06Q 30/06* (2012.01)
*H04L 9/40* (2022.01)

(52) U.S. Cl.
CPC ..... *G06Q 30/0627* (2013.01); *H04L 63/0421* (2013.01)

(58) Field of Classification Search
CPC ............... G06Q 30/00; G06Q 30/0601; G06Q 30/0613; G06Q 30/0641
See application file for complete search history.

(56) References Cited

U.S. PATENT DOCUMENTS

| | | | |
|---|---|---|---|
| 7,107,226 B1 * | 9/2006 | Cassidy | G06Q 30/0625 707/999.005 |
| 7,337,166 B2 * | 2/2008 | Bailey | G06F 16/2428 |
| 7,496,670 B1 * | 2/2009 | Givoly | G06Q 30/02 709/224 |

(Continued)

FOREIGN PATENT DOCUMENTS

WO    WO-2019238972 A1    12/2019

OTHER PUBLICATIONS

Benčić, Federico Matteo, Pavle Skočir, and Ivana Podnar Žarko. "DL-Tags: DLT and smart tags for decentralized, privacy-preserving, and verifiable supply chain management." IEEE access 7 (2019): 46198-46209. (Year: 2019).*

(Continued)

*Primary Examiner* — Christopher B Seibert
(74) *Attorney, Agent, or Firm* — Wilson Sonsini Goodrich & Rosati (57) ABSTRACT

Provided herein are database structures, systems, and methods for an anonymous, information exchange platform. The information exchange platform described herein may comprise blockchain structures, decentralized networks, peer-to-peer technology, cryptographic techniques, and/or a combination thereof. Past and present actors associated with a topic of information (e.g., a product) may flexibly exchange information on the information exchange platform by implementing question and answer protocols.

20 Claims, 1 Drawing Sheet

(56) References Cited

U.S. PATENT DOCUMENTS

| | | | | |
|---|---|---|---|---|
| 2001/0032170 A1* | 10/2001 | Sheth | ............... | G06Q 10/103 705/26.1 |
| 2003/0014317 A1* | 1/2003 | Siegel | ............... | G06Q 20/203 705/28 |
| 2003/0220830 A1* | 11/2003 | Myr | ............... | G06Q 30/0245 705/14.54 |
| 2004/0243505 A1* | 12/2004 | Sweeting | ............... | G06Q 40/00 705/37 |
| 2004/0254950 A1* | 12/2004 | Musgrove | ............... | G06F 16/904 707/999.102 |
| 2005/0177474 A1* | 8/2005 | Ma | ............... | G06Q 40/00 705/30 |
| 2006/0074780 A1* | 4/2006 | Taylor | ............... | G06Q 40/04 705/37 |
| 2007/0088625 A1* | 4/2007 | Fish | ............... | G06Q 30/02 705/26.7 |
| 2007/0094056 A1* | 4/2007 | Kang | ............... | G06Q 10/02 705/5 |
| 2007/0179868 A1* | 8/2007 | Bozym | ............... | G06Q 30/0601 705/26.1 |
| 2008/0052372 A1* | 2/2008 | Weber | ............... | G06F 16/58 707/E17.026 |
| 2008/0222046 A1* | 9/2008 | McIsaac | ............... | G07F 7/1016 705/64 |
| 2009/0138817 A1* | 5/2009 | Oron | ............... | G06F 16/9577 715/788 |
| 2009/0150262 A1* | 6/2009 | Mizhen | ............... | G06Q 30/0601 705/26.1 |
| 2010/0205551 A1* | 8/2010 | Underwood | ............... | G06F 3/04842 715/760 |
| 2011/0047014 A1* | 2/2011 | De Angelo | ............... | G06F 3/0482 715/810 |
| 2011/0161384 A1* | 6/2011 | Wykes | ............... | G06Q 30/0603 707/822 |
| 2011/0238484 A1* | 9/2011 | Toumayan | ............... | G06Q 30/0641 709/225 |
| 2012/0109713 A1* | 5/2012 | Wilhite | ............... | G06Q 30/0609 705/26.4 |
| 2012/0215665 A1* | 8/2012 | Marshall | ............... | H04L 67/02 705/27.1 |
| 2012/0226620 A1* | 9/2012 | Junger | ............... | G06Q 30/00 705/304 |
| 2012/0265648 A1* | 10/2012 | Jerome | ............... | G06Q 10/10 705/26.62 |
| 2013/0041778 A1* | 2/2013 | Nativ | ............... | G06Q 30/0633 705/26.62 |
| 2013/0151481 A1* | 6/2013 | Andrasick | ............... | G06F 16/951 707/E17.014 |
| 2013/0268437 A1* | 10/2013 | Desai | ............... | G06Q 20/3674 705/41 |
| 2016/0036798 A1* | 2/2016 | Mulhearn | ............... | H04W 12/065 726/7 |
| 2016/0098723 A1* | 4/2016 | Feeney | ............... | G06Q 20/065 705/75 |
| 2018/0117446 A1 | 5/2018 | Tran et al. | | |
| 2018/0130034 A1 | 5/2018 | Taylor et al. | | |
| 2018/0211213 A1* | 7/2018 | Vivier | ............... | H04L 9/3239 |
| 2018/0349879 A1* | 12/2018 | High | ............... | G06Q 20/405 |
| 2021/0119764 A1* | 4/2021 | Meghji | ............... | H04L 63/0407 |

OTHER PUBLICATIONS

Esmaeilzadeh, Pouyan, and Tala Mirzaei. "The potential of blockchain technology for health information exchange: experimental study from patients' perspectives." Journal of medical Internet research 21.6 (2019) (Year: 2019).*

PCT/EP2019/065820 International Search Report & Written Opinion dated Sep. 23, 2019.

* cited by examiner

DISTRIBUTED DATABASE STRUCTURES FOR ANONYMOUS INFORMATION EXCHANGE

CROSS-REFERENCE

This application is a continuation of International Application No. PCT/EP2019/065820, filed Jun. 17, 2019, which claims the benefit of U.S. Provisional Patent Application No. 62/685,781, filed Jun. 15, 2018, each of which applications is entirely incorporated herein by reference.

BACKGROUND

At present, most of the world's economy works in a linear fashion. Raw materials are extracted, products are assembled, more products are assembled out of other products, products are consumed, and products are disposed. A circular economy strives to let as many "consumed" products be reintroduced into the economy instead of being thrown away after a single use. Reintroduction can happen, such as via repairing, re-using, refurbishing, and recycling a product that is otherwise disposed.

SUMMARY

However, for the circular economy to be effective, a product must correctly transition into the next generation product. In order to do so, it is imperative that information about the product in its previous life (or lives), is available such as to comply with regulations (e.g., to avoid health and environmental hazards) when processing the product for reintroduction into the economy. There are numerous actors involved in the life span of a product who may not be willing to volunteer such information, such as because they do not want one actor (having information) to be in direct contact with another actor (needing information), for fear of security breach of confidential information, losing control of information once disclosed to a single entity, and the like. Even when information is provided, it is hard to verify reliability of such information. Thus, recognized herein in a need for an information exchange platform that preserves anonymity while preserving accountability for the information providers. Provided herein are database structures, systems, and methods for an anonymous, distributed information exchange platform. Participants of the information exchange platform may anonymously exchange information while remaining accountable for the content. Past and present actors (e.g., users, entities, etc.) associated with a topic of information (e.g., a product) may flexibly exchange information on the information exchange platform by identifying a network of data, and either finding an answer to a question or finding a participant likely to have an answer to the question.

In an aspect, provided is a method for distributed information exchange relating to a product, comprising: (a) scanning, using a detector, a label of the product, wherein the label is linked to a first manifest stored in a distributed data structure; (b) accessing a network of anonymous manifests comprising a plurality of manifests in the distributed data structure, including the first manifest, by navigating one or more network links associated with the first manifest; and (c) retrieving an answer to a query about the product by: (i) identifying a pre-existing answer to the query in a relevant manifest of the plurality of manifests, or (ii) identifying a creator of a relevant manifest of the plurality of manifests, wherein the creator of the relevant manifest is likely to provide an answer to the query, and inquiring the query to the creator of the relevant manifest via a secure communication channel.

In some embodiments, a creator of the first manifest is anonymous.

In some embodiments, each creator of the plurality of manifests is anonymous.

In some embodiments, the query is a push-query and one of the plurality of manifests comprises the pre-existing answer.

In some embodiments, the query is a pull-query and none of the plurality of manifests comprises the pre-existing answer. In some embodiments, the relevant manifest is identified at least in part by filtering the plurality of manifests by a topic of the query. In some embodiments, the answer is verified by a commitment to the topic.

In some embodiments, the first manifest comprises incomplete information about the product.

In some embodiments, the network of anonymous manifests comprises linked nodes of the plurality of manifests.

In some embodiments, the method further comprises verifying an association of a requestor of the answer to a first group, wherein the relevant manifest authorizes access to one or more groups including the first group. In some embodiments, the relevant manifest denies access to users who are not associated with the one or more groups.

In some embodiments, the answer is validated using one or more of tracing, mass-balance systems, and tokenized certification.

In some embodiments, the answer is pre-validated.
In some embodiments, the answer is post-validated.
In some embodiments, the answer is binary.
In some embodiments, the answer is non-binary.

In another aspect, provided is a system for distributed information exchange relating to a product, comprising: a distributed data structure comprising a plurality of manifests; and one or more processors, individually or collectively, programmed to: access a first manifest of the plurality of manifests in the distributed data structure, wherein the first manifest is associated with the product; access a network of anonymous manifests comprising the plurality of manifests in the distributed data structure, including the first manifest, by navigating one or more network links associated with the first manifest; and retrieve an answer to a query about the product by: (i) identifying a pre-existing answer to the query in a relevant manifest of the plurality of manifests, or (ii) identifying a creator of a relevant manifest of the plurality of manifests, wherein the creator of the relevant manifest is likely to provide an answer to the query, and inquiring the query to the creator of the relevant manifest via a secure communication channel.

In another aspect, provided is a system for distributed information exchange relating to a product, comprising: one or more processors, individually or collectively, programmed to: access a first manifest of a plurality of manifests, in a distributed data structure, upon scanning of a label of the product, wherein the label is linked to the first manifest; access a network of anonymous manifests comprising the plurality of manifests in the distributed data structure, including the first manifest, by navigating one or more network links associated with the first manifest; and retrieve an answer to a query about the product by: (i) identifying a pre-existing answer to the query in a relevant manifest of the plurality of manifests, or (ii) identifying a creator of a relevant manifest of the plurality of manifests, wherein the creator of the relevant manifest is likely to provide an answer to the query, and inquiring the query to the creator of the relevant manifest via a secure communication channel.

In another aspect, provided is a system for distributed information exchange, comprising: one or more processors, individually or collectively, programmed to: access a network of anonymous manifests comprising a plurality of manifests in a distributed data structure, including a first manifest, by navigating one or more network links associated with the first manifest; and retrieve an answer to a query by: (i) identifying a pre-existing answer to the query in a relevant manifest of the plurality of manifests, or (ii) identifying a creator of a relevant manifest of the plurality of manifests, wherein the creator of the relevant manifest is likely to provide an answer to the query, and inquiring the query to the creator of the relevant manifest via a secure communication channel.

In some embodiments, a creator of the first manifest is anonymous.

In some embodiments, each creator of the plurality of manifests is anonymous.

In some embodiments, the query is a push-query and one of the plurality of manifests comprises the pre-existing answer.

In some embodiments, the query is a pull-query and none of the plurality of manifests comprises the pre-existing answer.

In some embodiments, the relevant manifest is identified at least in part by filtering the plurality of manifests by a topic of the query.

In some embodiments, the answer is verified by a commitment to the topic.

In some embodiments, the first manifest comprises incomplete information about the product.

In some embodiments, the network of anonymous manifests comprises linked nodes of the plurality of manifests.

In some embodiments, the one or more processors are, individually or collectively, programmed to verify an association of a requestor of the answer to a first group, wherein the relevant manifest authorizes access to one or more groups including the first group.

In some embodiments, the relevant manifest denies access to users who are not associated with the one or more groups.

In some embodiments, the answer is validated using one or more of tracing, mass-balance systems, and tokenized certification.

In some embodiments, the answer is pre-validated.
In some embodiments, the answer is post-validated.
In some embodiments, the answer is binary.
In some embodiments, the answer is non-binary.
In some embodiments, the system further comprises a detector configured to scan a label of the product, wherein the label is associated with the first manifest.

In some embodiments, the detector is an optical detector.
In some embodiments, the detector is a non-optical detector.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "FIGURE" and "FIG." herein) of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Provided herein are database structures, systems, and methods for an anonymous, information exchange platform. The information exchange platform described herein may comprise blockchain structures, decentralized networks, peer-to-peer technology, cryptographic techniques, and/or a combination thereof. Beneficially, participants of the information exchange platform may anonymously exchange information while remaining accountable for the content. Past and present actors (e.g., users, entities, etc.) associated with a topic of information (e.g., a product) may flexibly exchange information on the information exchange platform. In some instances, the information exchange platform may store product data of a product. Where a part of an original product is (or becomes) a part of a derivative product, the information exchange platform may associate the respective product data of the original product and the derivative product.

A product may generally refer to any tangible object (e.g., television, screw, etc.). In some instances, a product may also refer to an intangible object (e.g., software package, computer program, open source code, etc.). A product may be an assembly, package, combination, collection, and/or set of a plurality of individual objects. A product may be or comprise one or more parts or components (e.g., display screen, chips, drive engine, frames, panels, screws, etc.). A derivative product may derive from another product. For example, a derivative product may be an outcome of repair, re-use, refurbishing, recycling, assembly, disassembly, modification, update, or other manipulation of another product (e.g., a motherboard having a chip may be a derivative product of the chip; a napkin recycled from a waste material may be a derivative product of the waste material; etc.). In some instances, a derivative product may be derived from an original product. In some instances, a derivative product may be derived from another derivative product. For example, a derivative product may be a primary derivative product (e.g., derived from an original product), secondary derivative product (e.g., derived from a primary derivative product), tertiary derivative product (e.g., derived from a secondary derivative product), and so on. A derivative product may derive from a plurality of other products, such as when it comprises a first part from a first other product and a second part from a second other product.

A value chain may represent the life of a product. The value chain may comprise a plurality of nodes. Each node in a value chain may be associated with an actor or an activity related to the product. For example, a product may move along the nodes of a value chain in an upstream to downstream direction, where "upstream" is closer to raw resource extraction for manufacture of the product and "downstream" is closer to use by an end user (or termination after use, such as to a recycler or to a disposal entity). Alternatively or in addition, the "upstream" to "downstream" direction may refer to a chronological direction. In an example, in the value chain of an example product, the example product moves from a first node associated with a smelter actor and smelting activity to a second node associated with a manufacturer actor and manufacturing activity to a third node associated with a retailer actor and retail activity to a fourth node associated with a user actor and usage activity to a fifth node associated with a recycler actor and recycling activity.

An actor of a value chain of a product may refer to any individual or any entity. An actor may be a group of individuals or a group of entities. For example, an actor may include a consumer, a user (e.g., an intermediate user, an end user, etc.), a recycling company, a manufacturer, a retailer, a distributor, a packaging company, and the like.

A product may have associated product data. The term "product data" is used interchangeably with the term "manifest" herein. In some instances, each product may be tagged by a unique label. The label may be linked to the product data of the product. In some instances, the label may be a tangible label (e.g., printed, drawn, or affixed to the product or to a different object associated with the product, etc.). In some instances, the label may be an intangible label (e.g., rendered digitally or stored as metadata, etc.). For example, the unique label may be a code (e.g., 1 dimensional (1D), 2 dimensional (2D), 3 dimensional (3D), quick response (QR), barcode, encrypted, alphanumeric, etc.), a marker, identification number, and the like. The label may be an optical code. The label may be a non-optical code (e.g., audio, electronic, haptic, etc.). The label may be scanned for linking to the manifest. For example, the label may be scanned using a scanner or other optical detector. The scanner or other optical detector may be communicatively coupled to a user device (e.g., mobile phone, laptop, tablet, wearable device, etc.). The label may be detected using a different type of sensor (e.g., microphone, etc.) or detector, including a non-optical detector. In some instances, the label may be selected using a hyperlink.

Product data may include data and/or metadata about the product. For example, the product data may comprise information about the value chain network of the product (e.g., order of nodes, identities of the actor, details about the activities, etc.), information about the product (e.g., raw materials, process or method of manufacture, date of manufacture, chemical exposure, shelf life, flammability, chemical composition, tensile stress resistance, etc.), and/or identities of users that know of certain types of information. For example, product may comprise product-specific information (e.g., physical properties, hazardous contents, toxicity, hard data, etc.) and process-specific information (e.g., labor conditions, sustainability indicators, soft data, etc.). An actor in the value chain of the product may know about, or create or update, one or more parts of the product data. For example, each actor may know the identities of the immediately preceding actor (e.g., supplier) and the immediately succeeding actor (e.g., client) in the value chain. In another example, each actor may know the details of the activity handled by the respective actor. In some instances, an actor may only know incomplete product data. In some instances, an actor may know the complete product data. In some instances, different parts of product data may be associated with different nodes. In some instances, the product data of a derivative product may comprise, or otherwise be associated with, the respective product data of the product(s) the derivative product derived from. For example, the value chain network of the derivative product may comprise or otherwise be associated with, a part of the value chain network of the product(s) the derivative product derived from.

A particular actor in a value chain of a product may require product data of the product not available to the particular actor in order to process the product. For example, a recycler (e.g., end stage actor in the value chain) may require the chemical composition information (e.g., product data) of a battery (e.g., the product) to properly recycle (e.g., process) the battery. Such product data may not be immediately available in traditional circumstances, such as because the identities of actors upstream of the recycler are unknown to the recycler, there are too many actors to track down (e.g., suppliers of suppliers of suppliers of the battery), different actors know different parts of the product data, intermediaries have no incentives to participate in the information exchange, and/or reliability of information obtained is questionable.

The information exchange platform described herein provides an information exchange channel between a first user requiring a particular piece of information (e.g., part of product data) and a second user who has the particular piece of information. Users of the information exchange platform may be referred to as "participants." Provided herein are smart questioning and answering protocols.

A centralized data storage solution, where the entirety of information resides in and is accessed from a central location and managed by an external, central management system, may encounter technical shortfalls such as limited granularity of control on which users can access what data and when, the limited privacy of users providing certain data to the system (e.g., the identities of those users may be revealed to the recipient), and limited security of stored data (e.g., the data may be mutable). As opposed to a centralized data storage solution, the information exchange platform of the present disclosure allows information to reside in distributed nodes (e.g., with different users). The information exchange platform may provide a path between a first node and a second node in order to provide the information exchange channel between the two nodes, while maintaining anonymity of the identities of the users associated with the two nodes. Beneficially, such distributed information storage (and access) allows for flexible control of information dissemination, such as with respect to which users get access to the information, to exactly what information or part thereof, and when (or for how long) they have access to the information. The distributed information platform may also be less prone to security breaches to protected data. Furthermore, the anonymity maintained between the two users (sender node and recipient node) during an information exchange may incentivize an intermediary connector (an intermediary node) to allow itself to act as a proxy to connect the otherwise disconnected two users—without such anonymity, the intermediary may be less inclined to do so such as for fear of losing business or because they are otherwise bound to keep either party's identity confidential.

In some instances, reliability of the information exchanged may be maintained by storing a log or records of all information transfers, such that a user cannot at a later time deny, contrary to the log or records, that there was an information exchange activity, or in some cases, what information was exchanged. Such log or records may be especially useful for auditing purposes. In some instances, reliability of the information exchanged may be maintained by associating a digital identity of a user to the user's real identity, and making such association public knowledge.

The information exchange platform may implement one or more question and answer protocols, wherein a first user asks a question about a product, and another user who is knowledgeable about the product either pre-provides or responds to the question with the answer, to facilitate information exchange.

In some cases, product data may be pre-validated, such as before or during production or end manufacture. In some cases, product data may be post-validated, such as by reverse-engineering or performing testing procedures. In some instances, process-specific data associated with a product may be pre-validated. In some instances, product-specific data associated with a product may be post-validated. Product data may be validated (e.g., pre-validated, post-validated) by a validator. The validator may be a third party to an information requestor and information recipient. Validated data may be validated beyond a reasonable doubt standard or other standard (e.g., preponderance of evidence, etc.). Systems and methods for validation are described elsewhere herein.

Figure 1:
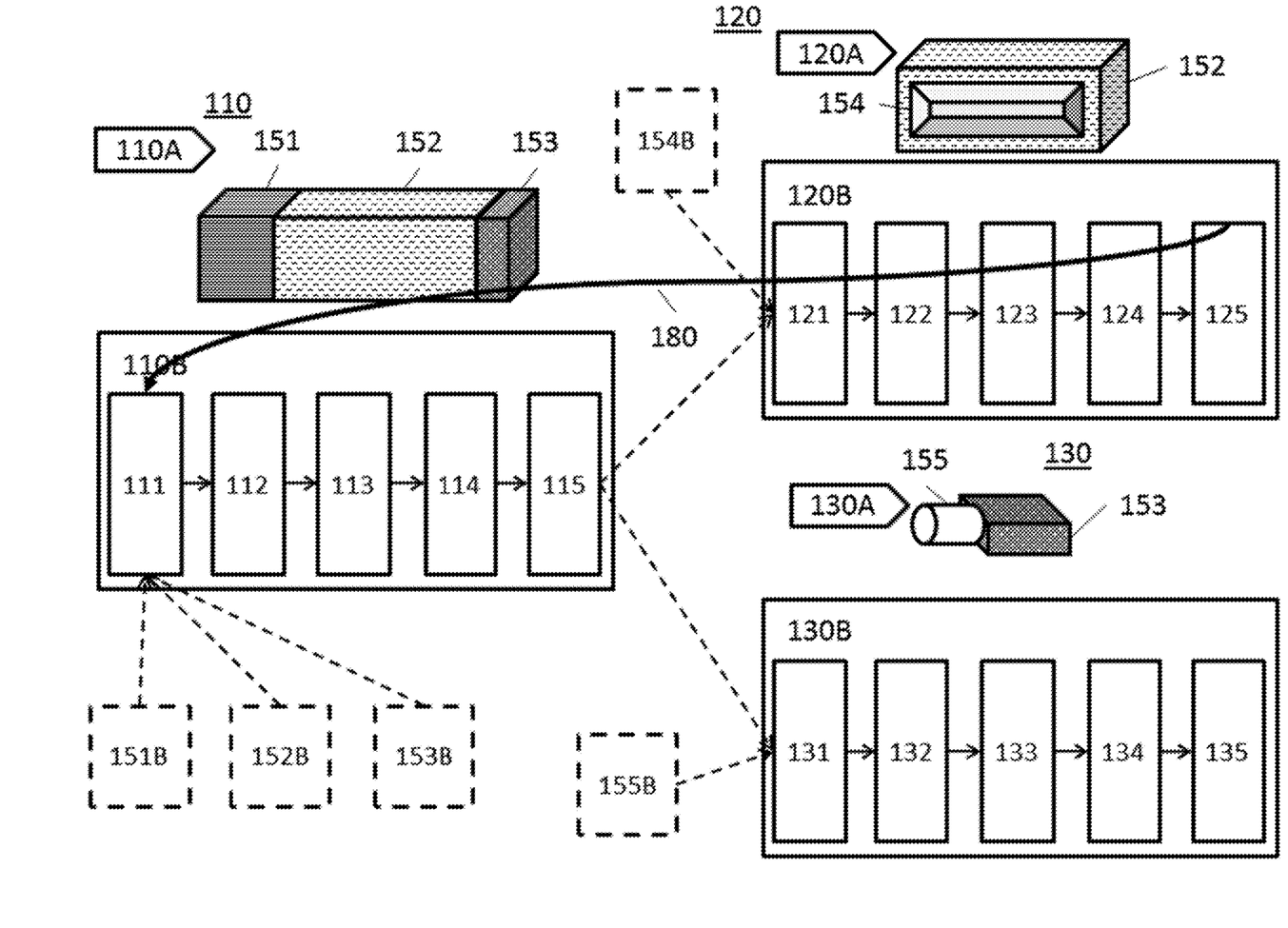
FIG. 1 illustrates a schematic for information storage and exchange.

FIG. 1 illustrates a schematic for information storage and exchange. Illustrated is a first product 110 which comprises an assembly of parts 151, 152, and 153, with a first label 110A and associated first product data 110B. Each of the parts 151, 152, and 153 may be its own product having its own label and associated product data 151B, 152B, and 153B, respectively. The first product data 110B may comprise distributed portions of data at a first node 111, second node 112, third node 113, fourth node 114, and fifth node 115 in the value chain. The first product data 110B may further comprise or be associated with (e.g., overlap with) part or whole of product data 151B, 152B, and 153B. For example, the first node 111 made comprise or be associated with the product data 151B of part 151, the product data 152B of part 152, and the product data 153B of part 153.

As illustrated, the different parts of the product data may be stored on a blockchain network at different nodes. The blockchain network may comprise a distributed data structure. The blockchain may comprise a secure and distributed ledger of transactions. In some embodiments, a blockchain is a data structure that stores a list of transactions, forming a distributed electronic ledger that records transactions between source identifiers and destination identifiers. The transactions are bundled into blocks and every block (except for the first block) refers back to or is linked to a prior block in the chain. Different nodes maintain the blockchain and validate each new block and the transactions contained therein. The integrity of the blockchain is maintained because each block refers to or includes a cryptographic hash value of the prior block. Accordingly, once a block refers to a prior block, it becomes difficult to modify or tamper with the data (e.g., the transactions) contained therein. This is because even a small modification to the data will affect the hash value of the entire block. Each additional block increases the difficulty of tampering with the contents of an earlier block. Thus, even though the contents of a blockchain may be available for all to see, they become immutable.

At each node, each product can be attached to a label which links to a product-level manifest (e.g., product data) that is stored on the blockchain. The manifest may contain an anonymized identity of the manifest creator, information that is used to answer questions, and network links to other manifests. By following the network links, from a single manifest, one can obtain information about more manifests (residing at different nodes) and follow their links in turn to gradually build an anonymous representation of the value chain of a product. A manifest may provide the structure of the network and the anonymized identities of the nodes part of the network, but not the real identities of the individual nodes. For example, one may find out that 3 manufacturers, 2 repairers, 1 retailer, and 2 brokers were involved in the value chain, and which actor was dealing with which actor, but not their real identities. Within this value chain network, only direct contacts (pre-existing contacts) of a manifest's creator in real-life may know the actual identities of the manifest's creator—immediate suppliers and clients know each other's identities in the real world.

In some instances, a manifest may be of a product line-level, such as to contain information about product lines or brands. This avoids the need to modify each individual product's manifest. The higher level manifests may be linked via product links.

Referring back to FIG. 1, a second product 120 may comprise an assembly of parts 152 and 154 with a second label 120A and associated second product data 120B. Part 154 may be its own product having its own label and associated product data 154B. The second product 120 may be a derivative product of the first product 110 in that part 152 has been recycled from the first product. The second product data 120B may comprise distributed portions of data at a first node 121, second node 122, third node 123, fourth node 124, and fifth node 125 in the value chain. The second product data 120B may further comprise or be associated with (e.g., overlap with) part or whole of the first product data 110B, such as the parts of the first product data that relates to part 152 (e.g., product data 152B). The second product data 120B may further comprise part or whole of product data of another product (e.g., product data 154B), such as the product from which part 154 originated from. That is, one or more nodes in the second product data 120B may be linked to one or more nodes in the first product data 110B. For example, as illustrated, the fifth node 115 is linked (via a network link) to the first node 121.

A third product 130 may comprise an assembly of parts 153 and 155, with a third label 130A and associated third product data 130B. The third product 130 may be a derivative product of the first product 110 in that part 153 has been recycled from the first product. The third product data 130B may comprise data at a first node 131, second node 132, third node 133, fourth node 134, and fifth node 135 in the value chain. The third product data 130B may further comprise or be associated with (e.g., overlap with) part or whole of the first product data 110B, such as the parts of the first product data that relates to part 153 (e.g., product data 153B). The third product data 120B may further comprise part or whole of product data of another product (e.g., product data 155B), such as the product from which part 155 originated from. That is, one or more nodes in the third product data 130B may be linked to one or more nodes in the first product data 110B. For example, as illustrated, the fifth node 115 is linked (via a network link) to the first node 131. As seen in FIG. 1, a value chain may track different components and/or assemblies or disassembly of different products.

Information may be obtained from manifests during an information exchange session via questions and answers. Provided herein are systems and methods for smart questioning and answering protocols. For example, a user having access to node 125 from a label of product 120 may be able to find information about part 152 from a user having access to node 111 by navigating the extended network of manifests and opening a secure communication channel 180 while preserving the identities of both users.

Questions are predefined and answers relating to the products are linked to the questions by participants. Questions may be freeform strings that have to be manually answered. Questions may contain metadata concerning their topics (e.g. whether the question is about mercury), which can be used by participants to verify the correctness of the answer (e.g., using commitments, as described elsewhere herein). Alternatively or in addition, a question may be in the form of a query. For example, the query may have the form, "Does the product contain Material X," for which it would be known that the answer is either "yes" or "no." The query may be compatible with binary answers (e.g., true/false, 0/1, yes/no) or non-binary answers (e.g., a string, characters, words, numbers, etc.). The question may be in other query forms. In some instances, the platform may implement one or more algorithms (e.g., implementing natural language processing (NLP)) to parse out the query language. A question may be a push-question, which a participant has pre-answered, or a pull-question, in which no pre-existing answer exists. The two types of questions both involve adding information to the manifest.

For example, push-questions may include questions to answers that are mandatorily disclosed by law. A push-question may include any other custom questions that are defined by other participants. A push-question may be useful where answers are desired to be available at any future time, even if the participant that supplied them has left the network. For push-questions, answers are stored directly in the manifest and subsequently propagated downstream as the label moves along the value chain. This allows anyone with access to the manifest and the right authorization (i.e., belonging to the right groups) to access the answers. A push-question may form a question/answer pair (QA) with a corresponding answer in the manifest. The QA pair may be a pointer-string pair. For example, asking a push-question may trigger looking up the data linked to the push-question, and verifying authorization to view the answer.

Pull-questions are useful when participants want to obtain additional or more in-depth information or when the answers are more confidential. Pull-questions can be asked to anyone in the value chain. The network formed by the manifests can be used to find and select the right anonymized participant to ask the question to. If the selected party knows the answer and accepts the inquirer's authorization (e.g., belonging to the right groups), they can respond through a secure communication channel. Pull-questions can be transitioned into push-questions when a participant deems it necessary by updating the manifest to include the answers to the push-questions. This can be useful when, for instance, a question becomes mandatory in the future, when it was not in the past. Some questions may have associated topic/commitment pairs (TC pairs), which can be used to verify the answers to these questions. TC pairs can contain information that is more generic than those of QA pairs, which have been made for specific questions. Instead of specific questions, they focus on storing verifiable information on topics. Commitments may comprise numeric values. For example, the commitment on the 'quantity of an ingredient' can be used to answer (in a verifiable way) the exact amount, a threshold, or a range of the quantity of the ingredient. Even though it is unknown what specific question may be asked in the future, there may exist a subset of answers which can be verified with commitments that have been provided in the past. Answering pull-questions using existing commitments, while not required, may make the information more trustworthy.

The information exchange platform may comprise a number of smart contracts that implement several information exchange protocols described herein. Using these protocols, participants can exchange information with other participants.

A protocol can support publication of a group. Each participant may decide who they trust with their information by limiting access to such information to one or more defined groups with authorization. For example, a manufacturer may entrust only a certain group of certified recyclers with the answers to certain sensitive questions. Any participant can create and manage a group of participants. A group may be given a label (e.g., "trusted recyclers"). When a participant shares a piece of information, they can select which groups are authorized to view it. A group may be created with an initial set of members. A group's creator may be responsible for selecting the members of the group. An asymmetric key pair may be generated of which the public key is published along with the other metadata of the group (owner, members, and group name). The private key, however, is not immediately distributed among the prospective participants. Membership in the group may be confirmed before members obtain the private key. Before they obtain the private key, they need to confirm that they want to be part of the group. The platform may verify that a participant is a member of a group when there is mutual verification; that is, the participant confirms it belongs to a group and the group confirms that the participant is part of the group. A participant can own (e.g., create) a plurality of groups.

A participant can belong to a plurality of groups. Interactions regarding the creation, modification, and deletion of groups can be facilitated on the blockchain via smart contracts, and as such are transparent to anyone with access to the public ledger of transactions. Every group may have an asymmetric key pair for which answers can be encrypted, so that only members of the group have access to that answer. A public key can be used to encrypt data specifically for the members of a group, whose members have access to the associated private key. In some instances, the creator may add pointers to other groups, which may add the members of those other groups to the creator's group. For example, when a group GA contains a pointer to another group GB, the members of GB are also considered members of GA. The same holds for when GB points to a group GC—then the members of GC are also considered members of GA. All of these members (direct and indirect) are given access to the private key that is paired with group GA's public key.

A protocol can support adding or removing a participant to or from a group. Such operations may require extra management of the group key, such as to prevent departed members of a group to later access new information encrypted for members of the group. New key pairs may be generated each time the group's composition changes.

A protocol can manage question lists. Any participant can create a question list to become a quiz master of the list. Other participants may have the option to subscribe to the list, such as to have access to every question in the list. To avoid tampering, the lists may be stored on the blockchain. A question list may import questions from other question lists. A question list can only be updated by its quiz master. An update to a question list may create a new version of that list. Participants may specify which version of the question list they subscribe to. In some instances, subscriptions to a list may carry over across different versions. In other instances, subscribers may verify whether or not to subscribe to a newer version of the list. This allows users to stay subscribed to a previous version, as an update might include new questions that they do not want to answer. For example, an auditor may create a question list to become a quiz master, and update the list as the audit investigation progresses. In some instances, question lists can contain questions which participant are required to answer. For example, these questions can include questions that subscribers are legally obliged to answer.

A protocol can manage subscriptions to question lists. Participants may subscribe to a question list to show their intention of answering the questions. The list of subscriptions, and authorization information about which groups are allowed to read the answers, may be included in the manifest. A notification may be pushed as an event on a smart contract whenever a question list is updated. A participant may be subscribed to multiple lists and/or multiple versions of the same list.

A protocol can support publication and modification of a manifest. A participant can publish a new manifest or modify an existing one that they own. For example, a participant can create an empty data structure and populate it with information, such as general product information, push-questions and answers thereto, links to other manifests, subscribed question lists, and anonymized ownership information. Each participant may select a secret, anonymous identity every time they create a manifest. Each participant may own a private registry comprising a list of all the secret identities corresponding to the manifests that they have published.

The manifest may be linked to a label (e.g., on the product) and published on the blockchain. The manifest can be used by both inquirers and respondents to acquire information for asking and answering questions. Additionally, the manifest can also be used for verifying answers. The published manifest can be viewed by any participant but the identity of the creator may be anonymized and sensitive information such as answers to push-questions and product links may be encrypted. Information in a manifest may be modified by its creator. The blockchain may provide immutable history, such that each old version and modified version remain available on the blockchain.

A manifest can contain entries such as push QA pairs, a bill of materials in combination with commitments (e.g., TC pairs), a pointer to a collection of question lists, pointers to product line manifests and model manifests (e.g., product links), pointers to the manifest of parent and child products (e.g., network links), the manifest holder, the manifest creator (e.g., anonymous address), the manifest creator's real identity encrypted with the holder key, and any other metadata (e.g., serial number).

A manifest can have any number of holders, a holder being any party who has or has had physical access to the label linked to the manifest, in which a private key is stored. Anyone with access to the label can use this private key and therefore become identified as the holder of the label. Parties are required to store the private holder key when they see it, so that they can continue to act as holder after they no longer have possession of the label. This is especially important for audits as this is the only way to identify manifest creators. The anonymous identity of the manifest creator is recorded on the manifest which allows creators to claim ownership of the manifest when needed. Because a new anonymous identity is used for each manifest, it cannot be directly linked to the respondent's public identity without additional information. The real identity of the creator is also stored in the manifest, encrypted with the holder public key. The holder (typically a direct client) can reveal the creator's public identity.

The information a manifest contains can have different security levels. Some information can be public knowledge, while other information may be intended for more specific recipients and therefore be encrypted for specific groups.

Manifests can also contain TC pairs for answering pull-questions. These commitments are made for the bill of materials. If the list of materials is confidential in addition to the amounts, the information can be obfuscated by adding to the manifest spurious TC pairs about materials that are not in the product—commitments for the value 0. The commitments allow auditors to verify the veracity of claims made by the participant.

Network links are used to point to the child manifests and parent manifests. The parent manifests are the manifests of the components and raw materials that were involved in the creation of the product (upstream). The child manifests are the manifests of any product(s) of which this product is a material or component (downstream). In a manufacturing context, there is usually only one child. For example, the network links of a motherboard's manifest may point to the manifests of all the chips present on the board as well as the manifest of the laptop that is manufactured using the motherboard. For some parties, like production companies, many of the created products will have very similar information in their manifests. For example, all products from a product line may have the same material composition and user manual. To avoid unnecessarily duplicating information in this manner, a manifest may include references to virtual manifests that contain information for the whole product line, while that manifest can in turn point via links (e.g., product links) to a manifest containing the warranties that are shared by all electronic products of that company. Product links can be encrypted to preserve the anonymity of the manifest creator.

A protocol can manage push-questions. An inquirer may find answers to push-questions by using the information in the product's manifest linked to its label, and/or recursively following the network links upstream or downstream to find manifests that have the answers (or pieces thereof). Whether a participant can access the answer of a push-question depends on the group(s) that they are a member of, and the corresponding authorization of the group(s). For each QA pair, the authorization of the inquirer may be verified. Answers can be either public or encrypted for specific groups. For example, a customer that bought a product may only be allowed to see general product information, whereas a verified recycler/auditor may also see claims made about the particular contents of the product: the way it was manufactured, the origin of the materials, etc.

A protocol can manage pull-questions. A participant may be an inquirer and/or a respondent. The inquirer may use the information in the manifest, such as the network links, to find a manifest whose creator is likely to have the answer, or a part of the answer. For example, the inquirer may navigate the network links of a manifest linked to a scanned label of a product using the topics of TC pairs to filter for relevancy, and find the anonymous identities of the relevant manifest creator. The inquirer may then create a secure channel to ask the question to the anonymized identity of the creator of the manifest. Unless either participant discloses their identity, the identities will remain anonymous. At the same time, they will have the certainty that the inquirer is of the claimed group (with authorization) and that the respondent is the real owner of a manifest in the relevant value chain. The respondent may use the associated group of an inquirer to determine whether they want to answer the question. For example, the inquirer may provide a ring signature to prove authorization. In some instances, where the answers are to remain secret for anyone but the inquirer and the respondent, a Diffie-Hellman key exchange can be used.

A protocol can manage storage and verification of identifications. Here, the digital identity of each participant in the information exchange platform is publicly linked to the real-world identity of the participant. However, each participant remains the sole owner of the anonymous identity used for publishing manifests. Each participant can claim a name, e.g., conforming to Ethereum Improvement Proposal (EIP 137). Names can be represented on-chain as hash. There may be one public registry. Identities can be interacted by accessing the registry.

By implementing these protocols on the information exchange platform, participants can regulate their product information in two ways: they can decide with whom information is shared and how much information is shared. Participants can control what information is shared by fine-tuning when to answer a question. Similarly, they can control who obtains the information by making their answers readable only by those in possession of the right key (e.g., using groups).

Product data may be validated (e.g., pre-validated, post-validated) by a validator. In some instances, the validator may be a third party to information exchange participants (e.g., requestor, recipient, etc.). In some instances, the validator may be an information exchange participant.

Provided are systems and methods for data validation using the information exchange platforms described herein. Data may be validated through methods such as tracing technologies, mass-balance systems, certificate tokenization, third party audits, and/or a combination thereof. Tracing technologies may comprise marking a product with a tracer and proving that a creator of the tracer was, at some point in the manufacturing process, in possession of the marked product. The tracer may be an artificial tracer or a natural tracer. The tracer may be a tangible tracer or an intangible tracer. Using tracing technologies alone to validate data may expose the validation process to the risk of a malicious tracer creator from providing the tracer to other malicious downstream parties (that may fraudulently claim that their product originates from a different party that also received the tracer from the tracer creator). A mass-balance system may comprise balancing an input and output of materials at every manufacturing stage. For example, a source A may have certification for producing 100 tons of valid material. Up to 100 tons of material that originates from source A may be validated. Using a mass-balance system alone to validate may expose the validation process to the risk of a buyer who receives material from both source A and a third party source D and switching out source A's material for source D's material under the pretense that the material comes entirely from A. At least the abovementioned problems of data validation may be addressed by using a combination of tracing technologies and the mass-balance system to validate data. Tracers (e.g., artificial tracer, natural tracer) and/or ascertaining information thereof may be included in a manifest (or multiple manifests). Input and output material information and/or ascertaining information thereof may be included in a manifest (or multiple manifests).

Certificate tokenization may comprise either converting a certificate(s) into digitized units, converting a certified asset (s) into digitized units, or both. The certificate may be a process certificate or a product certificate. A process certificate may certify a whole product line (e.g., permanently, with a pre-determined expiration date, with pending periodic audits, etc.) and accordingly may validate as many products in the product line. In some instances, a certified entity may issue (e.g., mint) tokens, with authorization for minting assignable or withdrawable by the certificate entity who issues the certificate. In some instances, the certificate entity may issue new tokens to the manufacturer upon request (e.g., upon manufacture of an output). A product certificate may certify a quantifiable unit (e.g., predetermined amount) of products. In some instances, the certificate authority may issue the tokens and assign to the certified entity upon request (e.g., upon manufacture of an output). In some instances, there may be sufficient tokens to tag the certified output streams, and no more. A manifest for a certified output product may comprise such tokenized certification (e.g., by attaching a digital signature of the certificate to the manifest—wherein the digital signature may only be attached when the certificate is valid). The predetermined amount of circulating tokens, which are traceable, may ensure that a certain certificate is not double-spent. A tokenized certificate may be a point certificate that is transferrable downstream from an originating node by any actor (e.g., including non-certified entities). For example, such point certificate may validate data associated with origin of materials (e.g., unalterable historical facts) and tracer presence (e.g., permanent chemo-physical properties). A tokenized certificate may be a flow certificate that is transferrable downstream only by actors with the same certification (e.g., child-labor-free, $CO_2$-neutral, etc.). The presence of a tokenized certificate may be probed using the smart questioning and answering protocols described herein. In some instances, each manifest may contain an indication of the value of the certificate as well as an indication of how much of that value has already been spent. In some instances, the value of the certificate in the product may be proportional or determined by product weight.

Using such validation schemes, a user may be able to verify whether or not product data has been validated. For example, if the data has not been validated, the user may be given an indication that the data is not validated (e.g., an explicit message that the data is not validated, a lack of tokenized certificate signature, etc.).

In an example, a manufacturer obtains a certificate for certain materials, and buys 10 kilograms of certified Magnesium (and 10 tokenized certificates), and uses such materials and Magnesium using a trade secret recipe (e.g., in which amount of Magnesium is secret, in which presence of Magnesium is secret, etc.) to manufacture 10 output products. The 10 output products may be associated with the 10 tokenized certificate (e.g., 1 tokenized certificate per 10 kilograms, etc.). The certificates and the tokens associated with the output products may remain with the owners and verified by the questioning and answering protocols. Depending on the query, different algorithms may be used to collect different required proofs.

Example

Beneficially, the information exchange platform allows for auditing. The goal of the auditor is to verify that participants are not misbehaving. For an audit, the cooperation of the auditee is always required. Cooperation for audits is not enforced by the system itself. If misbehavior is detected, the auditors can take appropriate action.

An auditor who is auditing a participant can, in addition to its normal checks, review the auditee's manifests. First the auditor can find out which manifests were created by the auditee. As the real identity of a manifest owner is a secret that is known by only the creators and its holders, the auditor may ask the creators or holders of the manifests to volunteer the identification. With the manifest in hand, the content can be verified. For a manifest, there are three types of things that can be audited: QA pairs, TC pairs, and the edit history of the manifest.

For publicly accessible QA pairs, the auditor may perform a straightforward review by reviewing the values. Encrypted values of QA pairs can be shown by either the creator of the manifest or the groups for which they are encrypted. As the creator of the QA pairs made the symmetric key, they are able to show the values of the QA pairs on the basis of the data stored on the blockchain. This proves that the shown value corresponds to the value on the manifest. Although, it does not prove that what is encrypted for the groups is the actual symmetric key, the parties are able to alert auditors if they obtain a faulty symmetric key. For the TC pairs in the manifest, the auditee can provide the hidden value and associated random value. As it is infeasible to find a pair that results in the same commitment, this pair can be considered the original one. The auditor can then verify the correctness of the hidden value using real-world channels.

In this way, the auditor can reliably verify that the information participants disclose about their products matches the truth. In some instances, verified data may be marked more trustworthy than unaudited data. In some instances, participants may be scored according to how often an audit has confirmed the information that they have provided.

The history of the manifest can be verified using the transaction history of the blockchain. This can be used to verify whether the auditee shows any suspicious behavior, such as whether the manifest was edited just previous to the audit to hide tampering. Manifests may also contain information that can certify the provenance of products and their production history, some of which may be subject to regulation. The data contained in manifests can thus be used by auditors to determine whether the associated product was manufactured and obtained through legitimate channels and procedures.

On discovery of a wrong answer, by the traceability provided the questioning protocols, the auditor may track down the origin of the false information. In the case of push questions, the secret identity of the origin is contained in the manifest that the QA pair comes from. For pull questions, the secret identity of the origin is known the very moment a communication channel is opened. In either case the wronged parties can call for an auditor to find the source of the problem. Linking a participant to an answer is easier than finding out all the manifests of the participant. Because the participant that requests an audit at least knows the identity of the next participant upstream (their supplier in the value chain), the requesting participant has seen the holder private key for their manifests, which can be used to decrypt the manifest's public identity for the auditor. This step can be repeated for each party in the value chain until the respondent is found.

Computer Systems

The present disclosure provides computer systems that are programmed to implement methods of the disclosure. For example, the computer system may be programmed to or otherwise configured to implement blockchain structures, decentralized networks, peer-to-peer technology, cryptographic techniques, and/or a combination thereof to facilitate the information exchange platform and information exchange protocols (e.g., smart questioning and answering protocols) described herein. The computer system can be an electronic device of a user or a computer system that is remotely located with respect to the electronic device. The electronic device can be a mobile electronic device. The computer system can be a server connected to a plurality of electronic devices of a plurality of users (e.g., participants of the information exchange platform).

The computer system includes a central processing unit (CPU, also "processor" and "computer processor" herein), which can be a single core or multi core processor, or a plurality of processors for parallel processing. The computer system also includes memory or memory location (e.g., random-access memory, read-only memory, flash memory), electronic storage unit (e.g., hard disk), communication interface (e.g., network adapter) for communicating with one or more other systems, and peripheral devices, such as cache, other memory, data storage and/or electronic display adapters. The memory, storage unit, interface and peripheral devices are in communication with the CPU through a communication bus, such as a motherboard. The storage unit can be a data storage unit (or data repository) for storing data. The computer system can be operatively coupled to a computer network ("network") with the aid of the communication interface (e.g., network adapter). The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The CPU can execute a sequence of machine-readable instructions, which can be embodied in a program or software. The instructions may be stored in a memory location, such as the memory. The instructions can be directed to the CPU, which can subsequently program or otherwise configure the CPU to implement methods of the present disclosure. Examples of operations performed by the CPU can include fetch, decode, execute, and writeback.

The CPU can be part of a circuit, such as an integrated circuit. One or more other components of the system can be included in the circuit. In some cases, the circuit is an application specific integrated circuit (ASIC).

The storage unit can store files, such as drivers, libraries and saved programs. The storage unit can store user data, e.g., user preferences and user programs. The computer system in some cases can include one or more additional data storage units that are external to the computer system, such as located on a remote server that is in communication with the computer system through an intranet or the Internet.

The computer system can communicate with one or more remote computer systems through the network. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system via the network.

Methods as described herein can be implemented by way of machine (e.g., computer processor) executable code stored on an electronic storage location of the computer system, such as, for example, on the memory or electronic storage unit. The machine executable or machine readable code can be provided in the form of software. During use, the code can be executed by the processor. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system can include or be in communication with an electronic display that comprises a user interface (UI) for providing, for example, a presentation of information, such as in the manifests described herein. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit. The algorithm can, for example, implement the various protocols described herein.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for distributed information exchange relating to a product, comprising:
  a decentralized blockchain network maintained by a plurality of computer nodes for storing a plurality of manifests related to the product, wherein one or more blocks of the decentralized blockchain network are validated by one or more of the plurality of computer nodes, and wherein at least one manifest comprises (i) an encrypted and anonymous identity of a creator of the manifest, and (ii) at least one of: a pair of push-question and a pre-existing answer and a pair of topic and verifiable information;

one or more processors, individually or collectively, programmed to:

implement a protocol in an information exchange session between a user device and at least one computer node associated with the at least one manifest, wherein a real identity of the creator of the at least one manifest is preserved as anonymous during the information exchange session, and wherein a query about the product is received via the user device; and upon determining the query is a push-question, retrieve and transmit to the user device an answer to the query about the product by identifying the pre-existing answer in the pair of push-question and pre-existing answer from the at least one manifest, or verifying the pre-existing answer using the pair of topic and verifiable information from the at least one manifest;

upon determining the query is a pull-question, retrieve the encrypted and anonymous identity of creator of the at least one manifest, wherein an answer to the query is provided by the creator to the user device via a secure communication channel established between the at least one computer node and the user device.

2. The system of claim 1, wherein the pair of push question and pre-existing answer is a pointer-string pair.

3. The system of claim 1, wherein the query is parsed out by natural language processing.

4. The system of claim 1, wherein the real identity of the creator is not published on the decentralized blockchain network.

5. The system of claim 1, wherein the at least one manifest further comprises a link to another manifest from the plurality of manifests related to the product.

6. A method for distributed information exchange relating to a product, comprising:

(a) receiving a query about the product from a user device, wherein a plurality of manifests related to the product are stored in a decentralized blockchain network, wherein the decentralized blockchain network are maintained by a plurality of computer nodes and wherein one or more blocks of the decentralized blockchain network are validated by one or more of the plurality of computer nodes; and (b) implementing a protocol in an information exchange session between the user device and at least one computer node associated with a manifest from the plurality of manifests, wherein the manifest comprises (i) an encrypted and anonymous identity of a creator of the manifest, and (ii) at least one of: a pair of push-question and a pre-existing answer and a pair of topic and verifiable information, and wherein the protocol comprises: (i)

upon determining the query is a push-question, retrieving and transmitting to the user device an answer to the query about the product by identifying the pre-existing answer in the pair of push-question and pre-existing answer from the manifest, or verifying the pre-existing answer using the pair of topic and verifiable information from the manifest, (ii) upon determining the query is a pull-question, retrieving the encrypted and anonymous identity of the creator of the manifest, wherein an answer to the query is provided by the creator to the user device via a secure communication channel established between the at least one computer node and the user device.

7. The method of claim 6, wherein a real identity of each creator of the plurality of manifests is not published on the decentralized blockchain network.

8. The method of claim 6, wherein the pair of push question and pre-existing answer is a pointer-string pair.

9. The method of claim 6, wherein the query is parsed out by natural language processing.

10. The method of claim 6, wherein the manifest is identified at least in part by filtering the plurality of manifests by a topic of the query.

11. The method of claim 6, wherein the verifiable information is a commitment to the topic.

12. The method of claim 6, wherein the manifest further comprises a link to another manifest from the plurality of manifests related to the product.

13. The method of claim 6, wherein the encrypted and anonymous identity of the creator is stored in a private registry.

14. The method of claim 6, further comprising verifying an association of a requestor of the answer to a first group, wherein access to the manifest is authorized to one or more groups including the first group.

15. The method of claim 14, wherein access to the manifest is denied to users who are not associated with the one or more groups.

16. The method of claim 6, wherein the answer is validated using one or more of tracing, mass-balance systems, and tokenized certification.

17. The method of claim 6, wherein the answer is pre-validated.

18. The method of claim 6, wherein the answer is post-validated.

19. The method of claim 6, wherein the answer is binary.

20. The method of claim 6, wherein the answer is non-binary.

* * * * *